United States Patent [19]
Krenke et al.

[11] 3,845,274
[45] Oct. 29, 1974

[54] TEMPERATURE CONTROLLER FOR HYBRID PROCESS TANKS

[75] Inventors: Gerald Krenke, Fairfield, Conn.; Howard M. Layton, Pound Ridge, N.Y.

[73] Assignee: Interlab Inc., Danbury, Conn.

[22] Filed: Sept. 26, 1973

[21] Appl. No.: 400,792

[52] U.S. Cl.............. 219/499, 165/169, 219/435, 219/441, 219/494, 219/501
[51] Int. Cl. ............................................ H05b 1/02
[58] Field of Search ........... 219/335, 338, 435, 438, 219/439, 441, 442, 494, 499, 501; 165/169; 131/161; 323/22

[56] References Cited
UNITED STATES PATENTS

| | | | |
|---|---|---|---|
| 1,704,413 | 3/1929 | Wait | 219/535 |
| 3,157,774 | 11/1964 | Moore et al. | 219/326 |
| 3,296,419 | 1/1967 | Sels | 219/499 |
| 3,299,346 | 1/1967 | Gambill | 323/22 |
| 3,489,881 | 1/1970 | Chambers | 219/499 |
| 3,525,452 | 8/1970 | Hofmann | 219/438 |
| 3,648,715 | 3/1972 | Boothe | 219/501 X |
| 3,649,366 | 3/1972 | Jordan et al. | 136/161 |
| 3,665,159 | 5/1972 | Becher et al. | 219/501 X |
| 3,767,898 | 10/1973 | Wells et al. | 219/441 |

Primary Examiner—Volodymyr Y. Mayewsky

[57] ABSTRACT

A temperature-regulating system to maintain the temperature of liquid containers in a hybrid process tank at a desired level, the vessel being constituted by an inner plastic vessel and an outer metallic jacket provided with heater elements. The jacket functions as a heat distributor to uniformly distribute the thermal energy applied to the interface of the vessel and the jacket, which energy is transferred by the plastic vessel to the liquid at a relatively slow rate. In order to raise the temperature of the liquid to the desired level and to maintain the liquid at this level without overheating and damaging the vessel, the system includes a first temperature-sensing resistor disposed at the interface of a heated plate and the plastic vessel, and a second temperature-sensing resistor immersed in the liquid, whereby the resistance of the first sensor reflects the quickly rising interface temperature and the resistance of the second sensor reflects the slowly rising liquid temperature. The two sensors are connected in series in one arm of a bridge that controls the application of power to the heater elements, the power being turned off when the bridge output determined by the ratio of the resistances of the sensors, attains a null.

7 Claims, 6 Drawing Figures

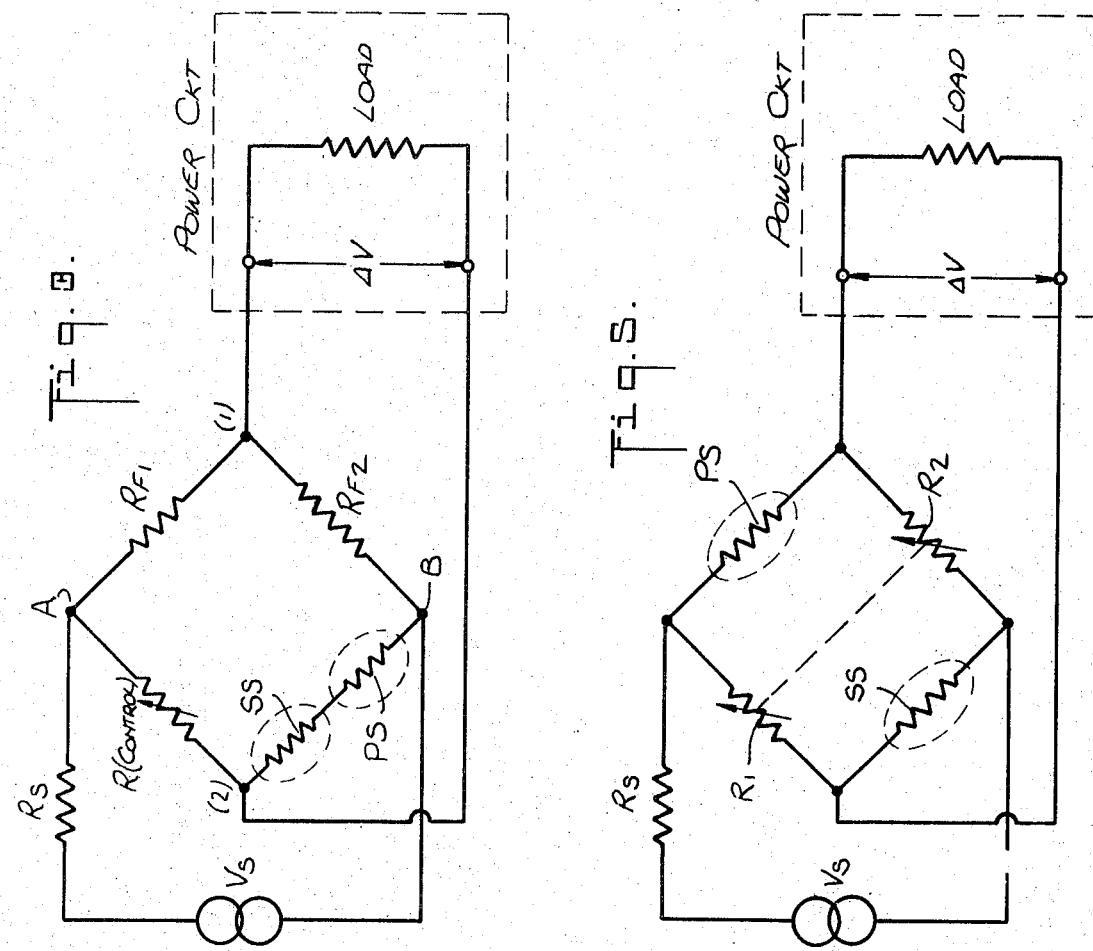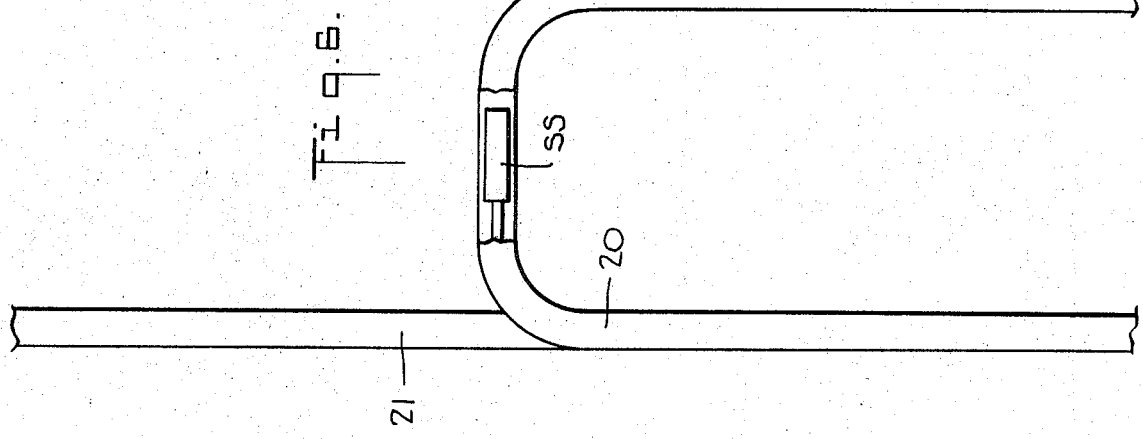

ID CONTROLLER FOR HYBRID
TEMPERATURE CONTROLLER FOR HYBRID PROCESS TANKS

RELATED APPLICATION

This application is related to the copending application entitled "Heated Vessels For Corrosive Fluids" Filed: Aug. 22, 1973, Ser. No.: 390,330.

BACKGROUND OF THE INVENTION

This invention relates to temperature regulating systems, and more particularly to a system controlling the temperature of a solution contained in a hybrid process tank.

The standard technique for regulating the temperature of a solution in a process tank makes use of a bridge-type, relay-operated, on-off controller. In this controller, a temperature-sensing resistor is immersed in the solution, the resistor forming one arm of the bridge, another arm of which is formed by a variable resistor to control set point. The value of the sensor resistor increases with a rise in temperature, the bridge being balanced to produce a null output only when the sensor resistance reflects the desired solution temperature. The relay which operates the heaters cuts off power thereto when the bridge is in balance and applies power when the bridge is unbalanced which is the condition prevailing when the solution temperature is below the desired level. Thus the relay functions to keep heater power on until the desired solution temperature level is attained, power then being turned off.

When the process tank is in the form of a hybrid structure of the type disclosed in the above-identified co-pending application, the standard bridge-type controller is not acceptable. In this hybrid structure, the solution is contained in a plastic vessel, surrounded by a metal jacket constituted by metal plates having heaters mounted thereon, the jacket serving as a heat distributor to apply thermal energy uniformly to the interface of the plastic vessel and the jacket. Because of the thermal characteristics of the plastic vessel, heat is transferred thereby to the solution at a relatively slow rate.

As a consequence, when a standard bridge-type controller is used, the solution in the plastic vessel heats up slowly even though the interface of the jacket and the plastic vessel heats up quickly. The controller therefore acts to energize the heater elements without interruption until the solution has attained the desired level. Even though the plastic vessel is formed of a temperature resistant material, it cannot withstand the high temperature applied thereto by the heater elements when operated continuously. Hence the standard controller cannot be safely employed with a hybrid vessel.

SUMMARY OF THE INVENTION

In view of the foregoing, it is the main object of this invention to provide a system for controlling the temperature of a solution contained in a hybrid process tank, having an inner vessel of plastic material.

More specifically, it is an object of this invention to provide a bridge-type temperature controller adapted to raise the temperature of a solution contained in a hybrid vessel to the desired level and to maintain the solution at this level without overheating and damaging the plastic wall of the inner vessel.

Also an object of this invention is to provide a controller of the above-type which includes two temperature-sensitive resistors, one of these sensors being immersed in the solution whose temperature is being regulated, the other sensor being disposed at the interface of the wall of the plastic vessel and a heating metal plate in contact with the plastic wall.

Yet another object of this invention is to provide an improved temperature sensor immersible in corrosive fluids.

Briefly stated, these objects are attained in a temperature controller which includes a first temperature-sensitive resistor disposed at the interface of a heated plate included in a metal jacket surrounding the plastic vessel and the wall of the vessel and a second temperature-sensitive resistor immersed in the solution contained in the vessel.

The two sensors are connected in series in one arm of a bridge, another arm of which is formed by a variable resistor for set point control, the output of the bridge being connected to a relay or other means for controlling the application of power to the heater for the hybrid tank, power being turned off when the bridge output, as determined by the ratio of the resistances of the sensors, attains a null.

Because transfer of thermal energy through the wall of the plastic vessel takes place at a relatively slow rate, the resistance of the first sensor, which responds directly to the temperature of the heater, increases quickly whereas the resistance of the second sensor, which responds to the slowly-rising temperature of the solution, increases slowly. As a consequence, power is applied to the heater intermittently as the temperature of the solution is raised to the desired level to avoid overheating the plastic vessel.

OUTLINE OF THE DRAWING

For a better understanding of the invention as well as other objects and further features thereof, reference is made to the following detailed description to be read in conjunction with the accompanying drawing, wherein:

FIG. 3 is a schematic diagram of a preferred embodiment of a controller in accordance with the invention;

FIG. 5 is a schematic diagram of a modified controller in accordance with the invention; and FIG. 6 is a perspective view of an improved immersion-type sensor according to the invention.

DESCRIPTION OF THE INVENTION

THE STANDARD CIRCUIT

Figure 1:
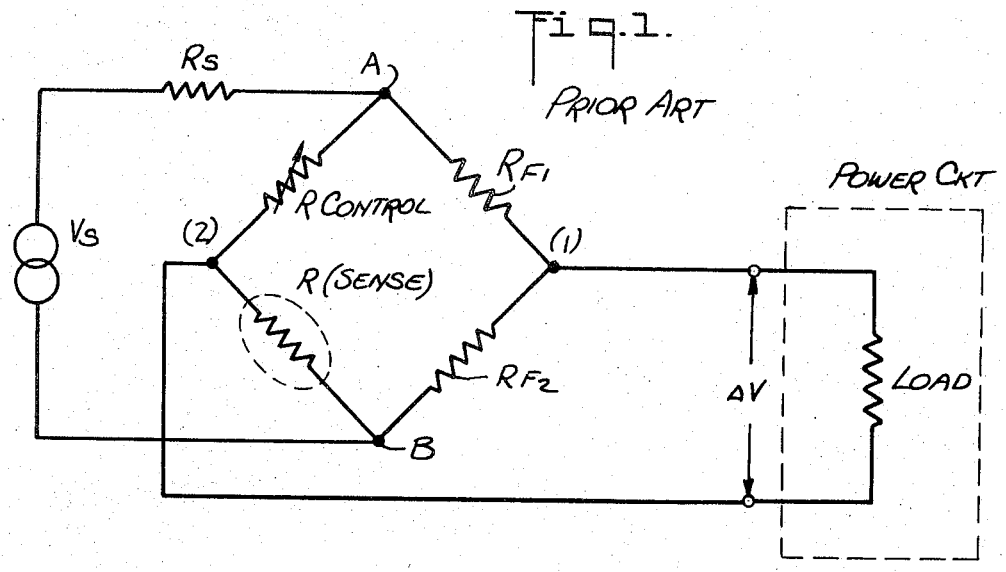
FIG. 1 is a schematic diagram of a convention bridge-type controller.

Referring now to FIG. 1, there is shown a standard temperature-regulating system of the bridge type, the system including a power source Vs which applies a constant voltage to the input diagonals A & B of a bridge through a resistor Rs. The bridge is made up of four arms, two of which are formed by fixed resistors $R_{F1}$ and $R_{F2}$. The other two arms are formed by a temperature-sensitive resistor R (sense) and a variable resistor R (control) which serves to vary the set point of the system. The arms $R_{F1}$ and $R_{F2}$ constitute one branch of the bridge and the arms R (control) and R (sense) constitute the second and parallel branch thereof.

The sensor R (sense) is immersed in the solution whose temperature is to be controlled or is attached to the side wall of the process tank in thermally conductive relation to the solution. The offset voltage $\Delta V$ developed at the output diagonals 1 and 2 represents the extent of bridge unbalance. This offset voltage is applied to a relay or other means controlling the power circuit for energizing the heaters. The arrangement is such that when the bridge is balanced, the offset voltage $\Delta V$ is zero or null and the heaters are turned off.

In order for a balanced relationship to exist, the ratios of the resistances in each of the two branches of the bridge (and the voltage ratio also) must be equal. That is to say:

$$R_{F2}/R_{F1} = R(\text{sense})/R(\text{control}) = K$$

Thus when the setting of resistor R (control) is increased or decreased to vary the set point, the resistance of the sensor R (sense) must correspondingly increase or decrease to maintain the ratio K. It can be seen that if the resistance of R (control) is initially increased, the ratio of R (sense) relative to R (control) is then less than K, thereby increasing the offset voltage $\Delta V$ from null to a voltage difference. This difference voltage activates the power circuit associated with the bridge to turn the heaters on, thereby causing a rise in the temperature of the solution. This rise will increase the resistance of resistor R (sense) to reestablish the ratio K, thereby restoring the null condition to turn off heater power.

But as pointed out previously, this standard controller technique is not practical with a hybrid tank because of limitations imposed by the thermal characteristics of the plastic vessel. We shall now consider the structure of this tank.

THE HYBRID VESSEL

Figure 2:
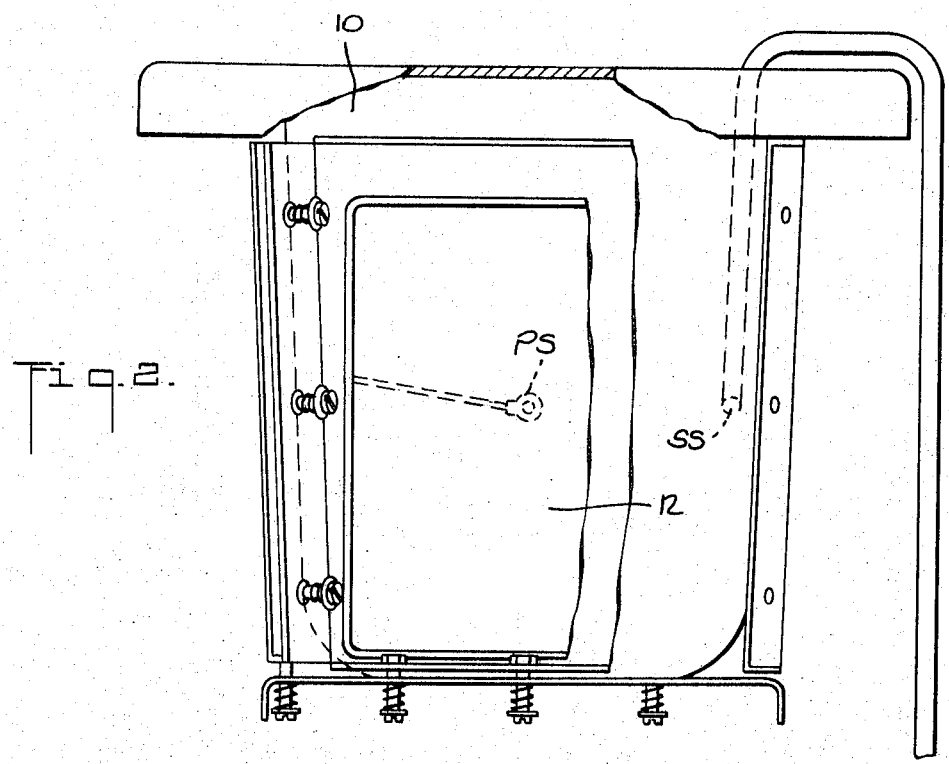
FIG. 2 shows a hybrid process tank having installed therein the two temperature sensors included in a controller in accordance with the invention.

As shown in FIG. 2, the hybrid tank is formed by a thin-wall inner plastic vessel 10 having a generally square configuration defined by four side walls and a bottom wall. The vessel is molded or otherwise formed of a high-temperature non-reactive material such as polycarbonate or a polypropylene While such materials may be subjected to relatively high temperatures there is a distinct limit to the temperature level that the material is capable of withstanding for a prolonged period.

Surrounding vessel 10 is a metal jacket constituted by five metal plate sections 11, four of which lie against the side walls of the vessel and the fifth against the bottom wall. The sections are formed with marginal flanges, complementary flanges of the sections being clamped together by spring-biased coupled screws that serve to force the sections into intimate contact with the walls of the vessel. Because the clamped joints are resilient, the jacket is capable of expanding and contracting to compensate for differences in the thermal expansion characteristics of the inner plastic vessel and the outer metallic jacket.

Mounted on the outer surface of each plate section is a heater blanket 12. In practice, a metal foil backing may be placed over the blanket to direct radiated heat toward the vessel. By proper control of wattage density and maximum heater temperature, the most efficient and safe heating of the solution can be obtained. A more detailed description of the hybrid tank is contained in the above-identified related application whose entire disclosure is incorporated herein, by reference.

THE NEW CONTROLLER

In a controller in accordance with the invention, a sensor PS is placed in thermal contact with metal plate 11, the sensor being interposed between the plate and the heater blanket 12. A second sensor SS, which will be more fully described in the next section, is immersed in the solution contained in vessel 10, this sensor being enclosed in a chemically inert but thermally conductive tube. Sensor PS exhibits an increasing resistance with an increase in temperature and sensor SS has a similar response characteristic. Thus as the plate heats up, the resistance of sensor PS increases and as the solution temperature rises, the resistance of sensor SS is increased.

As shown in FIG. 3, sensors PS and SS are connected in series relation in the control leg of the bridge circuit, which is otherwise identical to that shown in FIG. 1 and includes a set point resistor R (control) in the second leg in the sensor branch extending between input diagonals A and B and fixed resistors $RF_1$ and $RF_2$ in the legs of the parallel balancing branch.

By proper choice of the resistance ratio of the sensors, one is able to regulate the maximum temperature of heated plate 11 so that the maximum heater power may be applied without exceeding the thermal limits of the plastic material of the vessel 11 in contact with the plate. The plate sensor PS acts as an anticipatory device in a manner allowing the plate to remain as high in temperature as is necessary to keep a heat flow path to the solution long enough to bring the solution temperature within the control limits.

The controller operation is such that upon initiating a temperature setting, heater power begins increasing the plate temperature and this, in turn, raises the resistance of sensor PS at a faster rate than the resistance of the solution sensor SS. Since thermal transfer in the solution and through the plastic wall is much slower than through the metallic heater plate, any unrestrained application of power on the plate would cause a thermal run away effect and damage the plastic material and possibly damage the heaters. But with the plate and solution sensors PS and SS electrically connected in series, the total resistance of PS + SS contributes toward re-establishing the ratio $-K$ in the bridge to effect a null output ($\Delta V = O$).

When therefore power is first applied, the resistance of plate sensor PS increases rapidly to establish ratio $-K$ at which point power to the heaters is cut off momentarily. As the solution slowly rises in temperature, its sensor SS increases in resistance, which decreases the required temperature that the plate must rise to in order that the total sensor branch resistance be maintained. After a period of time, the solution temperature will have reached its required level and the plate temperature will have decreased and settled to a cyclical value about the solution control set point as determined by resistor R (control). The series connection of the sensors makes it possible for the plate to supply the maximum permissible heat when the solution temperature is low and to supply the minimum required heat when the solution temperature is attained in order to maintain a substantially constant temperature.

In other words, at the outset, the solution temperature is low and the plate temperature is high. In order to avoid overheating the plastic vessel while bringing the solution temperature to its proper level, the series combination of sensors act to effect intermittent control of heater power so that at no point is the vessel subjected to an excessive temperature in the course of raising the solution temperature.

Figure 4:
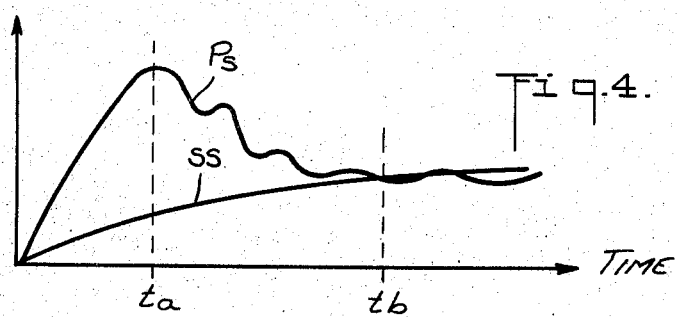
FIG. 4 is a graph illustrating the operation of the controller.

This action is illustrated in FIG. 4 wherein the curve PS represents the varying resistance of the plate sensor PS with time and the curve SS represents the varying resistance of the solution sensor SS during the same period. The total sensor resistance TS in the control branch is therefore equal to PS + SS.

For example, at an arbitrary temperature setting T-set point:
TS = PS + SS = constant
at time $t_a$; PS > SS
at time $t_b$; PS = SS The condition for null ($\Delta V = 0$) is that TS must always equal a constant determined by the control resistance setting R-control such that $$PS + SS/R\text{-control} = K \text{ (ratio)}$$

Then at $t_a$; $(PS) + (SS)_a = (TS)_a$
And at $t_b$; $(PS) + (SS)_b = (TS)_b$
Since TS = constant, then
EQUATION 1

$$(PS)_a + (SS)_a = (PS)_b + (SS)_b$$

A numerical example will demonstrate the above principle:

At a control setting of 75° C. when power is first applied, the value of sensor SS is 110 ohms at 25° C. solution temperature. The plate temperature rises such that the plate sensor PS resistance reaches 148 ohms which is typically a temperature of 125° C. (This assumes the solution temperature has not increased while the plate temperature rises). Assigning these values to $t_a$ $(SS)_a = $ 110 ohms $(PS)_a = 139.5$ ohms
When steady state ($t_b$) is reached, the temperatures of the plate and the solution are approximately equal. Therefore, the resistances of both sensors are:
$(PS)_b = (SS)_b = 129$ ohms
Then:
$(PS)_b + (SS)_b = 258$ ohms
$(PS)_a + (SS)_a = 148 + 110 = 258$ ohms
Therefore EQUATION 1 is satisfied.

In FIG. 5, the bridge circuit is so arranged as to include the sensor resistors SS and PS in one pair of opposing legs and the balancing resistors $R_1$ and $R_2$ in the other pair of legs. This also represents a practical method to control the temperature of the solution in the hybrid vessel, and the bridge circuit yields the same results as the arrangement shown in FIG. 3. The only difference in the FIG. 5 configuration is that at each setting, a new value of ratio-K is established. Selection of initial resistance values produce the same thermal cycling characteristics as in the arrangement shown in FIG. 3. The practical advantage of the FIG. 3 arrangement over that shown in FIG. 5 is that it involves only a single set-point control potentiometer, whereas in the latter, a dual control potentiometer is required.

The use of two sensors in a bridge-type controller in the manner described above is not limited to the context plastic vessels of the specific type described for this approach is also applicable to any situation where a power source temperature working in conjunction with a load can be held within thermal limits and remain operating at maximum permissible power.

One can best appreciate the advantages of anticipatory control when considering a worst case condition such as a situation in which there is no solution at all in the hybrid vessel. In this dry vessel situation, the fact that the solution sensor SS remains at low resistance because of the absence of solution, does not cause the maximum temperature of the heater surface to go above predetermined safe limits, for the combination of the plate sensor PS with the solution sensor SS precludes the generation of excessive heat and also protects the heaters against burnout.

SOLUTION SENSOR

For applications in which a metallically sheathed temperature sensor is unsatisfactory, plastic coatings and plastic sheaths are often used to protect the sensor from a corrosive solution. However, a plastic coating tends to suffer from the same disadvantages as plastic coatings for heated process vessels. For many uses, they are so thin as to be permeable to corrosives or so thick as to be inadequately sensitive. On the other hand, plastic sheaths hold more promise except that the points of termination or sealing are mechanically vulnerable and are inclined to develop leaks in service.

To overcome these disadvantages, the present invention makes use of a solution sensor having a loop formation which avoids mechanical terminations inside the vessel. The sensor SS itself (platinum wire thermistor or thermocouple) is mounted in the center of a long, thin, highly conductive metal tube 20 to which it is thermally bonded. This tube is then bent into the U-shaped configuration illustrated so that the sensor is positioned at the mid-bottom point of the U. Electrical connections from the sensor are brought out at either or both ends of the metal tube. Finally, to complete the sensor construction, a suitable heat-shrinkable plastic tubing 21, such as Teflon tubing, is slid over the entire tube sensor assembly and is "shrunk-on." If necessary for adequate assurance against porosity, a second plastic tube may be applied and shrunk over the first.

The completed sensor may be suitably terminated and these terminating points may be arranged to be outside of any area where even corrosive vapors are present. Thus a properly protected and highly reliable temperature sensor is provided suitable for immersion in corrosive liquid.

While there have been shown preferred embodiments of the invention, it will be appreciated that many changes may be made therein without, however, departing from the essential spirit of the invention.

I claim:

1. An electronic controller for regulating the temperature of a solution contained in a plastic tank heated by electrical heaters mounted on plates secured to the wall of the tank, said controller comprising:

A. a plate sensor in thermal contact with and responsive to the temperature of one of the plates and constituted by a resistor whose resistance increases with temperature;

B. a solution sensor immersed in and responsive to the temperature of the solution and constituted by a resistor whose resistance increases with temperature;

C. a bridge circuit having an input voltage applied thereto and including said sensors and arranged to yield a null output when the sensors have a predetermined resistance ratio and to yield an offset voltage output when the sensors depart from said ratio; and D. means responsive to said offset voltage to apply electrical energy derived from a source thereof to said heaters as a function of the varying value of said offset voltage whereby when the solution is relatively cold, the resistance of the plate sensor is high relative to said solution sensor and said heaters are energized intermittently to prevent overheating of the plate.

2. A controller as set forth in claim 1, wherein said sensors are connected in series in one leg of the bridge, another leg of which includes a variable set-point potentiometer.

3. A controller as set forth in claim 2, wherein the other two legs of the bridge include fixed resistors.

4. A controller as set forth in claim 1, wherein a constant voltage is applied to the input diagonals of the bridge and said output is derived from the output diagonals thereof.

5. A controller as set forth in claim 1, wherein said sensor resistors are placed in one pair of opposing legs of the bridge and two set point potentiometers are placed in the remaining pair of opposing legs.

6. A controller as set forth in claim 1, wherein said solution sensor is enclosed in the bottom leg of a looped-shaped metal tube immersed in said solution.

7. A controller as set forth in claim 6, wherein said metal tube is sheathed in a plastic tube.

* * * * *